United States Patent
Campfield et al.

(10) Patent No.: US 6,485,082 B2
(45) Date of Patent: Nov. 26, 2002

(54) METHOD AND MEANS FOR PROTECTING A WINDSHIELD FROM CRACKS

(76) Inventors: Richard Campfield, 2458 I-70 Business Loop, Ste. B1, Grand Junction, CO (US) 81501; Timothy Evans, 2006 Palm Dr., Colorado Springs, CO (US) 80918

(*) Notice: Subject to any disclaimer, the term of this patent is extended or adjusted under 35 U.S.C. 154(b) by 0 days.

(21) Appl. No.: 09/930,892

(22) Filed: Aug. 16, 2001

(65) Prior Publication Data

US 2002/0014778 A1 Feb. 7, 2002

Related U.S. Application Data

(63) Continuation of application No. 09/220,654, filed on Dec. 24, 1998, now Pat. No. 6,276,741, which is a continuation-in-part of application No. 09/138,771, filed on Aug. 24, 1998, now Pat. No. 6,227,599, which is a continuation-in-part of application No. 08/834,717, filed on Apr. 1, 1997, now Pat. No. 5,860,689, which is a continuation-in-part of application No. 08/646,036, filed on May 7, 1996, now Pat. No. 5,653,497.

(51) Int. Cl.$^7$ ................................................. B60J 11/00
(52) U.S. Cl. ........................ 296/95.1; 296/136; 296/97.7
(58) Field of Search ............................... 296/97.2, 97.5, 296/96.19, 96.21, 95.1, 97.7, 136, 93

(56) References Cited

U.S. PATENT DOCUMENTS

| | | | | | |
|---|---|---|---|---|---|
| 3,282,014 A | * | 11/1966 | Bamford et al. | ...... | 296/96.21 X |
| 3,400,972 A | * | 9/1968 | McIntyre et al. | .... | 296/96.19 X |
| 3,895,859 A | * | 7/1975 | Yoshida et al. | ...... | 296/96.19 X |
| 4,025,103 A | * | 5/1977 | Eichstaedt | ................. | 296/95.1 |
| 4,555,434 A | * | 11/1985 | Kunert | ................ | 296/96.19 X |
| 4,726,406 A | * | 2/1988 | Weatherspoon | ........ | 296/95.1 X |
| 4,768,823 A | * | 9/1988 | Martinez | ................... | 296/95.1 |
| 4,903,748 A | * | 2/1990 | Foraker | ................. | 296/95.1 X |
| 4,933,032 A | * | 6/1990 | Kunert | ................... | 296/84.1 X |
| 5,037,156 A | * | 8/1991 | Lundberg | .................. | 296/95.1 |
| 5,062,248 A | * | 11/1991 | Kunert | ................... | 296/84.1 X |
| 5,078,444 A | * | 1/1992 | Shirahata et al. | ............. | 296/93 |
| 5,107,646 A | * | 4/1992 | Tamura | ................. | 296/84.1 X |
| 5,123,468 A | * | 6/1992 | Mater, Jr. | ............... | 296/95.1 X |
| 5,263,759 A | * | 11/1993 | Brodie et al. | ............. | 296/93 X |
| 5,339,584 A | * | 8/1994 | Ohtake et al. | ......... | 296/84.1 X |
| 5,356,193 A | * | 10/1994 | Palmer, II et al. | .......... | 296/136 |
| 5,376,443 A | * | 12/1994 | Sijan et al. | ............ | 296/95.1 X |
| 5,384,995 A | * | 1/1995 | Kunert et al. | .......... | 296/84.1 X |
| 5,480,504 A | * | 1/1996 | Gold | ........................ | 296/93 X |
| 5,509,711 A | * | 4/1996 | Gold | ........................... | 296/93 |
| 5,538,314 A | * | 7/1996 | Young et al. | ............. | 296/93 X |
| 5,544,458 A | * | 8/1996 | Fisher et al. | ........... | 296/84.1 X |
| 5,614,051 A | * | 3/1997 | Fisher et al. | ........... | 296/84.1 X |

* cited by examiner

Primary Examiner—Joseph D. Pape
(74) Attorney, Agent, or Firm—Ancel W. Lewis, Jr.

(57) ABSTRACT

A structure means and method for protecting a windshield from damage and therefore the development of cracks due to stone or other impact on windshields around the peripheral area. An impact resistant barrier is placed around the periphery of the windshield. The barrier is preferably a clear polymeric film, but could be opaque, rubber, plastic or metal. The barrier is placed on the glass surface and in contact adjacent to the windshield molding. The width of the barrier is selected to eliminate the higher incidence of damage to the peripheral area. The barrier can be combined with a sunlight blocking ingredient to reduce degeneration of urethane which is used in mounting the windshield to the vehicle. A kit can be assembled with the elements needed to place the barrier on a windshield. The barrier can be applied in fluid form which achieves a film. The barrier can extend not only over the front surface, but also over the edge surface and the back surface.

12 Claims, 4 Drawing Sheets

FIG. 1
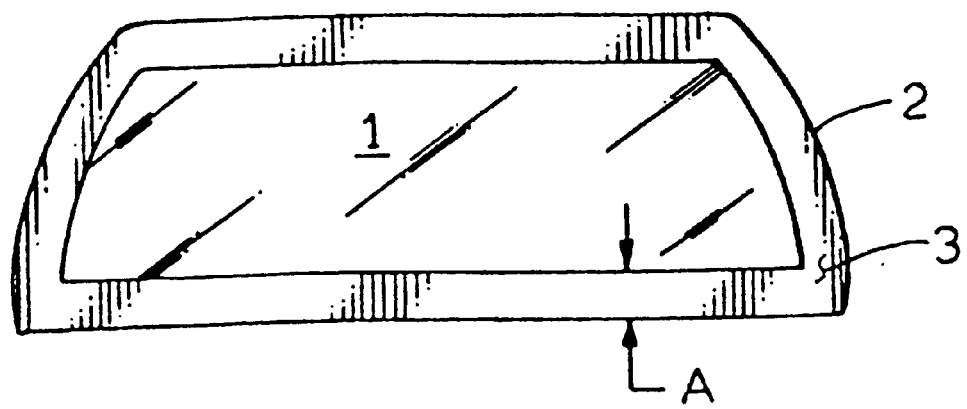
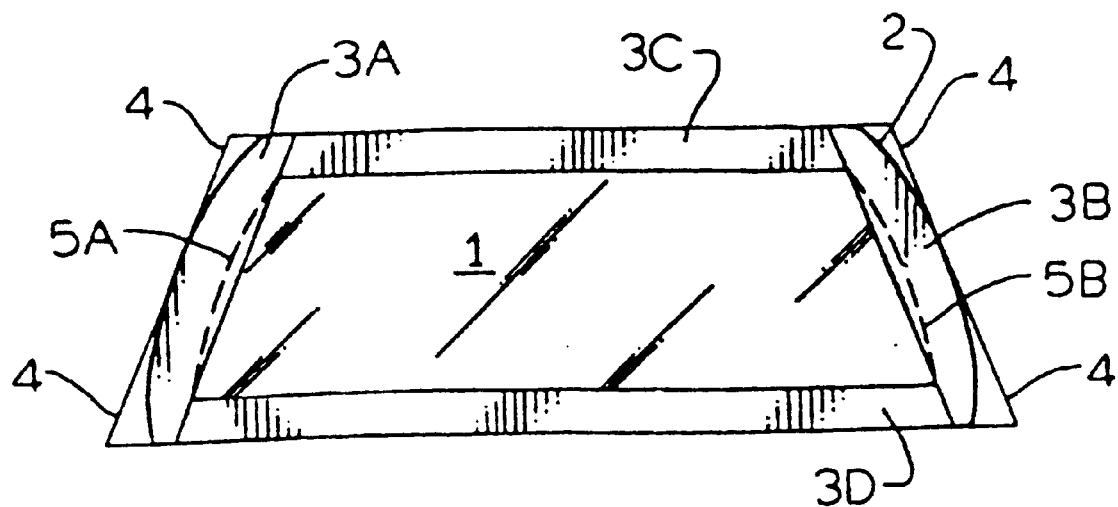
FIG. 2

METHOD AND MEANS FOR PROTECTING A WINDSHIELD FROM CRACKS

RELATED APPLICATIONS

This application is a continuation of Ser. No. 09/220,654 filed Dec. 24, 1998, now U.S. Pat. No. 6,276,741, which is a continuation-in-part of application Ser. No. 09/138,771 filed Aug. 24, 1998, now U.S. Pat. No. 6,227,599 which is a continuation-in-part of Ser. No. 08/834,717 filed on Apr. 1, 1997 now U.S. Pat. No. 5,860,689 which is a continuation-in-part of Ser. No. 08/646,036, filed on May 7, 1996 now U.S. Pat. No. 5,653,497, the content of all of which are incorporated by reference herein.

FIELD OF THE INVENTION

The invention relates to means and methods for preventing and protecting automobile windshields from damage caused by impacts from flying objects. In particular the invention relates to a barrier placed around the periphery of the windshield to absorb the impact from objects and thereby prevent damage.

BACKGROUND

Damage to windshields caused by debris or other impacts has long been a problem. Many patents have issued and a substantial business thrives respecting the repair of such damage. For a long time it was believed that long cracks, that is cracks over six inches in length could not be repaired. However, shorter cracks referred to as stone damage were repairable. Later through significant developments in the field it became possible to repair long cracks. Patents which relate to the repair of long cracks in windshields are U.S. Pat. Nos. 5,116,441, 5,425,827, 5,429,692, U.S. patent application Ser. Nos. 08/436,155, 08/436,591 and 08/459,039.

Also, there is a thriving business in the replacement of cracked windshields which either cannot be repaired or which are believed to be unrepairable. In fact replacement is vastly more common than repair.

Despite these thriving businesses damage to windshields present costs to the consumer because of the cost of the repair or replacement. When insurance covers the damage then there is an insurance company loss which is passed on to consumers through their premiums. Also tons of unrecycled waste are created year after year.

Impacts which cause damage near the glass edge nearly always result in an edge crack, that is a crack running through the impact point to the edge of the glass. These cracks are also nearly always long cracks, that is over 6 inches in length. By contrast impacts in the middle area of the windshield quite often result only in the limited damage known as chips or stone damage, that is a bullseye, a star break or a combination and absent any long crack. Thus the problem of windshield damage in the peripheral area is considerably greater than in the middle. Long cracks, especially edge cracks, demand attention soon after cracking and most end up being replaced.

Windshields are installed with a rubber or plastic and in some cases metal, molding. Presently, most moldings are 1–2 centimeters wide, about 50% of the molding width extending over the glass. The maximum known molding width covers 2 cm of the windshield glass.

In the past a windshield was prepared with a pre-installed molding prior to shipping called "encapsulated." This molding was a conventional molding covering about 1 centimeter of glass and was not intended to prevent damage from impacts. They are hard to remove and install and are a being discontinued.

SUMMARY OF THE INVENTION

The present invention provides a means and method for protecting a windshield from damage and therefore the development of cracks due to stone or other impact on windshields around the peripheral area According to the invention, an impact resistant barrier is placed around the periphery of the windshield. The barrier is preferably a clear polymeric film, but could be opaque rubber, plastic or metal. The barrier is placed on the glass surface and in contact adjacent to the windshield molding. The width of the barrier is selected to eliminate the higher incidence of damage in the peripheral area; but the width may differ between sides, top and bottom, and it may differ in various vehicles. In one form of the invention, a clear plastic film is adhered to the windshield around its periphery to a selected width from the windshield molding. The clear plastic film will absorb impact from flying debris and allow visibility. As an alternative, equivalent protection can be obtained by a wider molding. Also, the film need not be clear in all portions of the windshield. The barrier can be installed before the windshield is fitted to the vehicle in which case it could extend to the edge of the glass.

In an alternate preferred embodiment, a clear polymeric film is from 6–10 mils thick and a preferred thickness is 6–8 mils, most preferably 7 or 8 mils. The range of 6–8 mils and the 7 mils thickness being especially preferred or bowed windshield portions as thicker films are too stiff.

In another alternate preferred embodiment, the clear film is a polyester. A further preferred embodiment is a clear laminated multi-layer, preferably 2 layer polyester film 6–10 mils thick, more preferably 6–8 mils thick and most preferably 7 or 8 mils. The range of 6–8 mils and the 7 or 8 mils thickness being especially preferred on bowed windshield portions.

In another preferred embodiment, the impact barrier is applied as a fluid which forms a film. The fluid may be applied by any desired method such as by spraying, dipping, or rolling.

In another preferred embodiment, the film may be not only on the front surface of the windshield, but also on the edge portion and on the back surface.

In another preferred embodiment, the impact barrier may be combined with a portion which serves as a molding. It may also be constructed of material which is ultra-violet absorbent to protect urethane which is used to install the windshield.

The impact barrier preferably has a width on the front of the windshield from the edge of from about 1 to about 3 inches, more preferably of from about 2 to 3 inches, and most preferably of about 3 inches. The width at the bottom may vary depending on the vehicle's construction.

The impact barrier embodiments of this invention are known to provide prevention of a high percentage of cracks in windshields on passenger vehicles.

The impact barrier could also be applied to tempered glass such as the backglass and quarterpanels. These are made of tempered glass, but the backglass may only be a single layer and quarterpanels are single layers. These are more susceptible to shattering when hit near the edge. Therefore, use of the present invention on the tempered glass outside surface prevents such breakage.

The windshield has an important interaction with the passenger side air bag, since upon deploying it pushes against the windshield. Consequently, the windshield must stay in place in order that the passenger side air bag functions properly. It has been found that replacement windshields which have not been properly installed can pop out when the air bag deploys against it. The present invention prevents the damage which eases the need for replacements.

BRIEF DESCRIPTION OF DRAWINGS

FIG. 1 shows a front view of a windshield having the inventive film applied in an exemplary OEM application.

FIG. 2 shows a front view of a windshield having the inventive film applied in an exemplary aftermarket application

DETAILED DESCRIPTION

Figure 3:
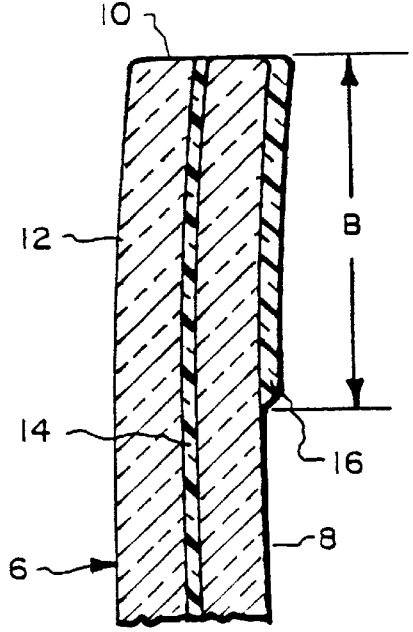
FIG. 3 shows a partial sectional view of a windshield segment with the impact barrier film applied on the front surface.

The invention is a method and means for protecting windshields from impacts which would cause damage, most importantly cracks of the kind which generally require replacement of the windshield, although in some cases repair is possible. In this invention, when applied to a windshield already installed, the impact absorbing barrier is adhered to the peripheral areas of the windshield, the sides, top and bottom, adjacent to the molding and extending a selected width into the glass area. When applied before the windshield is installed, the barrier can extend to the edge of the windshield so that a portion of it is captured under the windshield molding. The barrier may be clear or opaque, and may be of a variety of materials such as plastic film, rubber or metal.

Also the barrier may be constructed by extending the windshield retaining molding over the glass selected distance.

Plastic film is supplied and used in many thicknesses, configurations and plastic formulations. Selection of a film thickness and plastic formulation for use in this invention is such as to provide good impact absorption sufficient to prevent damage from impact which would allow a crack to form. In practice the selected material will prevent any damage, even a chip because as will be seen a chip in the vulnerable peripheral area commonly leads to an edge crack. In order to minimize distortion of visibility the film should be as thin as possible consistent with achieving the impact absorption goal. This is more important at the sides than at the top and bottom.

Referring to FIG. 1, in the present invention, an automobile windshield 1 having a molding 2 around its periphery is the subject of the invention. A clear plastic film 3 is placed around the periphery inside the molding. The film 3 should have the selected dimension A. It should be adhered permanently to the windshield by an adhesive layer. Alternatively the film can be adhered in a manner which allows periodic replacement, for example if the film becomes damaged or worn or loses its clarity.

Therefore, the film 3 will absorb impact and protect the windshield from rocks and other debris.

Over 90% of windshield long cracks are caused by impacts in the peripheral distance within 4 inches (approximately 10 cm) of the exposed periphery of the windshield, that is, within a margin measured from the molding to about 4 inches into the glass area. Most of these long cracks are caused by stones, although other flying debris can also cause such cracks.

The plastic film should be selected from a material that is clear and crack resistant and will not fog or discolor over time due to sunlight or severe weather conditions.

An exemplary film is 3M Scotchcal™. This is an 8 mils urethane plastic film sold by 3M. It has adhesive on one side which will be activated by a solution of 25% isopropyl alcohol and 75% water, then this film can be applied to a surface for protection. The film could be thicker, for example up to about 30 mils. A film should be as thick as necessary to absorb impact but not so thick as to interfere with any function of the windshield or the wipers.

A preferred method of providing the peripheral protection for OEM applications is to prepare a one piece four sided clear plastic frame of the selected dimensions. It would be shaped to fit along the inside of the molding although it could extend under the molding to the glass edge. Most windshields are curved at the sides, some are curved at the top or bottom. Therefore, the four sided plastic frame is configured to match the periphery of the windshield against the molding and extending inward into the viewing area the selected distance. The fame therefore should match the curves to give a uniform distance from the molding. This is seen in FIG. 1. However uniformity is not essential as noted below. If the film frame extends under the molding, then curved matching against the molding is irrelevant A preferred method of providing the peripheral protection for aftermarket applications uses a roll of film from which desired lengths are cut off. Then the pieces are laid onto the windshield, marked and cut to the desired configuration. FIG. 2 shows this means and method. The windshield 1 has a molding 2 surrounding it. The plastic frame is formed of four separate pieces, 3A, 3B, 3C and 3D on the left side, right side, top and bottom respectively. Since the individual frame pieces are cut from a roll or a strip of selected width the corners 4 are to be trimmed off, the ends cut to fit and the inside edges such as pieces 3A and 3B are preferably trimmed to a curvature to match the molding curvature as seen at 5A and 5B. Templates of paper or cardboard may be made first. Then the film element or elements are prepared with an adhesive and placed on the windshield. The film could also be supplied in wide sheets from which strips are cut having the requisite width and shape.

Alternatively, the plastic film may be opaque, or the material may be rubber or metal.

A 4 inch width of the impact absorbent barrier has been shown to be effective for over 90% of cracks, other dimensions are defined by the examples below.

An alternative form of the invention refers to the molding used to help set and hold the windshield in place. Widening the molding to a selected distance over the glass would accomplish the objectives of this invention. This could be done when the vehicle is manufactured or when the windshield is replaced.

EXAMPLE NO. 1

In this example a total of 235 windshields with long cracks were observed in shopping malls in the Colorado Springs, Colo. area in February 1996. These windshields all had long cracks i.e. over 6" long. Of these, 225 windshields had cracks from impacts up to 5 inches from the molding and all were edge cracks. The remaining 10 windshields had cracks where the impact point was more than 5 inches from the molding. These 10 were scattered all over the windshield middle area. Of these 10, some were edge cracks and some were not. The survey did not look at stone damage absent a long crack. It is frequent that an impact in the middle area does not result in a long crack, and very rare that it would result in an edge crack. For purposes of this survey it was considered that 5" would be the maximum guardable distance from the molding using the invention, due to practical limitations. The following data was observed:

| Crack Location | Percent Of Total At 5" Or Less | Percent Of Total |
| --- | --- | --- |
| 141 impact points of the cracks were at or within 1" (2.5 cm) of molding | 63% | 60% |
| 186 impact points of the cracks were at or within 2" (5.1 cm) of molding | 83% | 79% |
| 202 impact points of the cracks were at or within 3" (7.6 cm) of molding | 90% | 86% |
| 215 impact points of the cracks were at or within 4" (10.2 cm) of molding | 96% | 91% |
| 225 impact points of the cracks were at or within 5" (12.7 cm) of molding | 100% | 96% |
| 10 additional impact points of the cracks were more than 5" from the molding | | 100% |
| 235 | | |

NOTE: The above centimeter conversions are not intended to convey an accuracy level as the measurements were made in inches. Distances are considered to have a very large tolerance as great precision is not relevant. For example the 12.7 cm measurement as considered to be about 12 cm.

It is considered that these windshields would most likely be replaced, although the option of repair may be elected by some customers. Therefore if a film width of 5 inches or about 12 cm were employed only 10 of 235 windshields would not have been saved.

EXAMPLE II

In this example, 236 windshields with long cracks were observed at a shopping mall in Colorado Springs, Colo. in March 1996. Of the total, 203 damaged windshields with long cracks which were edge cracks from impacts within 6 cm of the edge.

Of the thirty three cracks from impacts beyond 6 cm from the molding, about half went to the edge. Of the thirty three, only three were from impacts in the distance between 6 cm and 12 cm from the molding. Also 415 chips were found which were more tan 6 cm from the edge, without any crack. Also there were 23 chips within 6 cm which had not yet cracked, although it is presumed they would crack shortly they are not counted as cracks in this survey.

This data can be summarized as follows:

TABLE 2

| | Percent of Total at 6 cm or less | Percent of Overall Total |
| --- | --- | --- |
| 74 of the impact points were at or within 1 cm of molding | 36% | 31% |
| 137 of the impact points were at or within 2 cm of molding | 67% | 58% |
| 163 of the impact points were at or within 3 cm of molding | 80% | 69% |
| 184 of the impact points were at or within 4 cm of molding | 91% | 78% |
| 191 of the impact points were at or within 5 cm of molding | 94% | 81% |
| 203 of the impact points were at or within 6 cm of molding | 100% | 86% |

TABLE 2-continued

|  | Percent of Total at 6 cm or less | Percent of Overall Total |
|---|---|---|
| 33 of the impact points were beyond 6 cm from the molding 236 |  | 100% |

The data from this survey summarized by impact location for 203 impacts within 6 cm are:

Top - 45 total windshields chipped at the top, all had cracked 16 were chipped at 1 (.39") centimeter from the molding.
9 were chipped at 1.5 centimeters from the molding.
5 were chipped at 2 centimeters from the molding.
1 was chipped at 2.5 centimeters from the molding.
6 were chipped at 3 centimeters from the molding.
3 were chipped at 3.5 centimeters from the molding.
3 were chipped at 4 centimeters from the molding.
2 were chipped at 5.5 centimeters from the molding.
45

Sides - 66 total windshields chipped at the sides, all had cracked 28 were chipped at 1 centimeter from the molding.
7 were chipped at 1.5 centimeters from the molding.
12 were chipped at 2 centimeters from the molding.
4 were chipped at 2.5 centimeters from the molding.
7 were chipped at 3 centimeters from the molding.
1 was chipped at 4 centimeters from the molding.
1 was chipped at 4.5 centimeters from the molding.
1 was chipped at 5 centimeters from the molding.
2 were chipped at 5.5 centimeters from the molding.
3 were chipped at 6 centimeters from the molding.
66

Bottom - 96 total windshields chipped at bottom, and had cracked 30 were chipped at 1 centimeter from the molding.
14 were chipped at 1.5 centimeters from the molding.
16 were chipped at 2 centimeters from the molding.
5 were chipped at 2.5 centimeters from the molding.
3 were chipped at 3 centimeters from the molding.
3 were chipped at 3.5 centimeters from the molding.
11 were chipped at 4 centimeters from the molding.
3 were chipped at 4.5 centimeters from the molding.
2 were chipped at 5 centimeters from the molding.
1 was chipped at 5.5 centimeters from the molding.
4 were chipped at 6 centimeters from the molding.
92

A number of chips which had not cracked were seen beyond 6 cm from the edge these are considered windshields that are not destroyed, as chips past 6 cm rarely crack. Also, 23 additional chips were observed within 6 cm of the molding, which had not cracked. Although these were not counted as cracks it is known that any chip from 6 cm or less will nearly always eventually produce an edge crack while chips beyond 6 cm rarely produce an edge crack.

The rules adapted by the Ultra Bond Corporation for its repair methods, establish that most cracks over 18" long should not be repaired because of dirt accumulation in such cracks. Thirty two of the 236 edge cracks were 18" or under. Under this rule, 32 of the 236 cracks were deemed repairable. The balance, 204, would not be considered repairable. However most cracked windshields are replaced anyway.

The data conclusion is that a 6 cm wide impact resistant film would have prevented 86% of the edge cracks.

EXAMPLE III

These data were observed over a period of time at a windshield replacement and repair shop in Colorado Springs, Colo. A total of 80 windshields were surveyed which had long cracks. Many chips (the impact point) were observed in the "frit" at the edge of the windshield. This is the black border near the edge of some windshields.

TABLE 1

| Cumulative Data | Percent of Total at 6 cm or Less | Percent of Overall Total |
|---|---|---|
| 36 of the impact points were at or within 1 cm of molding | 52% | 45% |
| 54 of the impact points were at or within 2 cm of molding | 78% | 67% |
| 60 of the impact points were at or within 3 cm of molding | 87% | 75% |
| 65 of the impact points were at or within 4 cm of molding | 94% | 81% |
| 68 of the impact points were at or within 5 cm of molding | 99% | 85% |
| 69 of the impact points were at or within 6 cm of molding 69 | 100% | 86% |
| 11 of the impact points were beyond 6 cm from the molding 80 |  | 100% |

Also in this survey distribution data for the 69 impacts were taken. These are:

16 were chipped at the top 1 at .5 cm
11 at 1 cm
3 at 2 cm
1 at 5 cm 22 were chipped on the sides 1 at .5 cm
10 at 1 cm
7 at 2 cm
1 at 2.5 cm
3 at 4 cm 31 were chipped on the bottom 1 at .5 cm
12 at 1 cm
2 at 1.5 cm
6 at 2 cm
5 at 3 cm
2 at 4 cm
1 at 4.5 cm
1 at 5 cm
1 at 6 cm

EXAMPLE IV

Forty-three windshields having edge cracks over six inches long were studied. Fourteen were cracked near the bottom. Of these, the chip location was noted as follows:

| Number of Observed | Distance of Impact From Bottom Molding | Percent of Total | Cumulative Total |
|---|---|---|---|
| 7 | 2.0 cm (0.79") | 50% | 50% |
| 3 | 1.0 cm (0.39") | 22% | 77% |

-continued

| Number of Observed | Distance of Impact From Bottom Molding | Percent of Total | Cumulative Total |
|---|---|---|---|
| 2 | 4.5 cm (1.77") | 14% | 86% |
| 2 | 12.0 cm (4.72") | 14% | 100% |
| 14 | | | |

The balance, 29, were elsewhere but close to the top and sides. That is, 32% of the cracks were from damage near the bottom versus the sides and top.

EXAMPLE V

A random survey of 200 repaired cracks from a windshield repair shop in Riverside, Calif. showed that 3 out of 200 long cracks were floaters (did not extend to the edge) and the balance, 197 were edge cracks.

Coupled with the data in Examples I–IV it is concluded that the overwhelming majority of long cracks are from impacts near the edge. Nearly all of these would result in windshield replacement, the edge crack is the cause of over 90% of windshield replacements. The present invention would nearly eliminate the need for windshield replacement or long crack repair.

So-called stone damage, that is damage that does not have a long crack frequently appears as a bullseye, star break or combination break. Sometimes stone damage results in later evolution of a long crack. However in the vulnerable peripheral areas, an impact is most frequently seen as a small surface chip, absent any bullseye or starring but with a crack running through the impact point to the edge of the glass. A chip, which defines the point of impact, when near the edge is usually just pin head size, but on some occasions it is a star or bullseye. In such cases, either instantly or very soon (minutes or at most a few hours) after impact a long crack appears running through the impact point to the edge of the glass (called an edge crack). Exceptions are extremely rare. Cracks from the top and bottom often proceed vertically for a short distance, then turn horizontally. Virtually all cracks formed from an impact in the vulnerable area extend to the glass edge. Cracks that extend to the glass edge open wider than cracks which don't extend to the glass edge and travel faster.

The peripheral area of the windshield defines a vulnerable area more specifically defined by the above data. It is believed that this vulnerability derives from the windshield being under greater stress and strain in the vulnerable area from being attached to the vehicle and the slight bow shape. Also, near the bottom there is increased strain from use of defrosters/heaters directed at the lower portion of the windshield.

For practical reasons it is considered that about 12 cm is the maximum guardable width of the periphery. This is due to concerns respecting interference by or damage to the barrier from windshield wiper operation and interference with visibility. Also wear and tear on wiper blades is a concern. This will vary among vehicle configurations. Also, it is appreciated that visibility concerns allow a wider film at the top and bottom. Also, in some vehicles the hood line is above the molding at the bottom of the windshield. That is, the windshield and the molding extend below the hood line.

A survey of windshield moldings disclosed the following data:

| Vehicle | Molding Width and Data |
|---|---|
| 1988 to 1995 Chevy Full Size P.U. | ⅜" Nags #1026–121 |
| 1986 to 1995 Ford Taurus | ⅜" Nags #1097 |
| 1990 to 1995 Ford Explorer | ⅜" Nags #1087 |
| 1985 to 1994 Subaru Loyale | ⅛" FCW #499 |
| 1982 to 1990 Chevy Celebrity | ¼" WIC #1005 |
| 1993 to 1995 Jeep Grand Cherokee | ¼" WIC #1142 |
| 1989 to 1995 Toyota P.U. | ⅜" Nags #598 |
| 1987 to 1995 Chrysler Leberon | ½" Nags #1077 |
| 1993 to 1995 Chrysler Concord | ⅜" Nags #1186 |

Another survey of windshield moldings disclosed the following data:

| Vehicle | Measurement of Molding |
|---|---|
| 1994 Ford Explorer | 2 cm |
| 1992 Mitsubishi Diamante | 1½ cm |
| 1982 Jeep Eagle | 2 cm |
| Geo Prizm | less than ½ cm |
| Saturn | 1½ cm |
| Toyota 4 Runner | 1½ cm |
| Dodge Dynasty | 1½ cm |
| Ford Bronco | 2 cm |
| Chevy Blazer | 1 cm |
| Buick Century | 1 cm |
| Dodge Caravan | 1 cm |
| Toyota Startlet | 2 cm |
| GMC Surburban | 2 cm |
| Ford Mustang | 2 cm |
| Chevy Corsica | 1½ cm |
| Toyota Celica | 1 cm |
| Jeep Grand Wagoneer | 1½ cm |
| Pontiac Grand Prix | 1 cm |
| Honda Civic | 1 cm |
| Subaru Wagon | 1 cm |
| Nissan Maxima | 1 cm |
| Ford Tempo | 1 cm |
| Audi 5000 | 1 cm |
| Buick Park Avenue | 1 cm |
| Honda Sedan | ½ cm |
| Honda Civic VX | ½ cm |
| Pontiac Transport | 1 cm |
| Cadillac | 2 cm |
| Honda Accord EX | 1 cm |
| 1994 Ford Taurus | 1 cm |

Therefore, if a barrier is to be provided by an extended molding, it should be preferably at least about 4 cm over the glass or preferably at least about 5 cm over the glass. The molding should preferably extend to a limit about the same distance as demonstrated by the foregoing examples.

It is appreciated that application of a shock absorbent film or other barrier on the bottom of the windshield will have to be different from that at the top and sides in many vehicles. This is because of the peculiar construction of some vehicles at and adjacent the bottom of the windshield. In some such cases the bottom of the windshield is under the level of the hood, and sometimes has as much as two inches of protection from the hood. The molding will be below the hood line. In such cases exposure of the windshield to damage begins at the level of the hood. That is, below the hood, it is not expected to see damage. Thus, the vulnerable area is defined as beginning from the hood line, where the windshield extends below the hood line. Also, some vehicles have a wider molding on the bottom and it may have a complex shape. Therefore it is useful to define an effective border for the bottom of the windshield which is either the molding inner edge or the hood line, whichever is higher. For the top and sides, the molding inner edge is the border. The 1986 Cadillac Sedan DeVille, for example, has a 6 cm. metal molding on the bottom and a 1 cm conventional molding on the top and sides. Also, when viewing the bottom of the windshield from the front, level with the hood, this 6 cm molding is not seen, that is, it does not cover any of the exposed glass, the entire 6 cm molding is beneath the level of the hood (note the 6 cm molding covers only about 2 cm of glass).

Moldings of such greater width apparently are only used on the bottom. Many vehicles have different molding on the bottom than on the top and sides. The impact protective barrier of this invention, can be wider on the bottom than at the top and sides because there is less potential interference with visibility, and in some cases it will extend below the hood. The bottom protective barrier will have to extend upward beyond the level of the hood. The top also allows greater width due to less potential interference with visibility.

Whether the protective barrier is incorporated into the OEM or replacement molding, the foregoing considerations should be appreciated. Many vehicles have a black "frit" which extends as much as 5 " on some vehicles, commonly about 1"–2" from the molding. If the impact absorbent barrier is limited to the frit then visibility would not necessarily be interfered with and therefore clarity if of less concern. An opaque barrier would be more acceptable.

In a preferred embodiment the film is a clear polyester. It can be a single-ply of film. A further preference is that the polyester film be a laminated multi-ply, more preferably 2-ply. Such films have a preferred thickness range of 6–10 mils, more preferably 6–8 mils, the most preferred thickness being 7 or 8 mils. The range of 6–8 mils thick is preferred when used with bowed windshield surfaces. The term bowed refers to curvature in the planar surface or body of the windshield, this term being used to distinguish over the term curved as related to the peripheral lines described above, as shown in FIGS. 1 & 2. Sometimes bowing is a compound curvature, the windshield being bowed both horizontally and vertically in the case of bowed surfaces, the film may be too stiff. Thus, it has been found that the thickness at 10 mils may be too stiff when applied to bowed surfaces while the 6–8 mil range is not too stiff. The most preferred thickness is 7 and 8 mils. These thickness designations refer to the nominal measurements provided by manufacturers of plastic film.

Polyester films exemplary of the above description and having been used successfully are made by MADICO, Inc., Woburn, Mass. as its product designations LCL-600-XSR and LCL-800-XSR and a 7 mil film sold by that company.

Further, the preferred film width is 3 inches for the top and sides and 4 inches for the bottom; this dimension being derived from a broad range of applications and experience to reach the best average for all applications. Also, special issues at the bottom are appreciated, that more impacts and therefore more edge cracks are seen at the bottom than at either the sides or top. Stone breaks that become edge cracks are more frequent at the bottom. Also, the bottom can tolerate a greater width because visibility is not an issue until higher on the windshield. And, finally, even if the windshield is below the hood line, 4 inches works well because the stresses on the windshield decrease as the distance from the edge increases. This is significant because it is not the distance per se from the edge which causes an edge crack, but rather the increased stress nearer to the edge.

In another aspect of the invention, universal molding is provided which has a selected width over the top of the glass. Such universal molding would be configured in its cross section according to the known shapes on the inside of the windshield, at the edge and at the outside of the windshield but in the latter case, that is over the outside of the windshield it will extend further. Selected universal moldings would preferably be made at 2 inches, 2 ½ inches and 3 inch widths. With these universal moldings available a glass replacement shop would select the best universal molding to fit the vehicle windshield so that it can replace not just the glass, but also provide the impact absorption protection of the invention by reason of the outside extended portion of the molding.

In another aspect of the invention, the invention can be practiced by applying a film or molding which an extended outside portion adhered to the windshield when the windshield is made. In this way a windshield replacement shop has supplied to it a windshield already combined with the impact absorbing film or coating.

In other aspects of the invention the impact barrier portion is a film which incorporates a frit. The kit is a black paint applied to the windshield to block sun rays from damaging the urethane adhesive which is used to adhere the windshield to the molding. In this aspect, in one example, a primary film of polycarbonate was assembled with another film laminated to it which was of black polyester. The laminate was adhered to the windshield with the black polyester film against the outer surface of the windshield, the film of polycarbonate being exterior.

This aspect can also be practiced with a single film on the windshield which is darkened or black, to prevent damage to the urethane adhesive by filtering out the damaging sunlight. The coloring material is of a type that will prevent sunlight which is degrading to urethane from passing through.

In this way the film can accomplish the dual function of impact barrier and protection of the urethane from sunlight damage.

In another aspect of the invention, especially useful for after market application, a kit is prepared. The kit is customized for a particular car, or cars. It is common in the industry that a windshield size and shape may be used on several vehicles. A set of kits can be defined for a large number of vehicles on the road. The kit has as its primary element four pieces of impact absorbing barrier material pre-shaped to fit the two sides, top and bottom of the windshield. Alternatively, the kit may only provide the top and sides, the bottom, the sides, or in fact any combination of the two sides, top and the bottom. Also, as discussed, these need not all be the same width, although they may be. Nor need they be of the same material. For example, the sides and top may be a polycarbonate film, and the bottom a metal strip. The sides and top may incorporate the dual purpose film described above by being darkened or black to protect urethane from sunlight damage while the bottom is a metal strip, which would also have the urethane protecting effect.

The impact absorbing barrier elements of the kit are conveniently made from a roll of film and cut to match the shape of the windshield to abut the molding and each other at their ends the cutting can be done by any convenient method, laser cutting having proven to be preferred. The impact absorbing barrier elements will have an adhesive layer on the side intended to lay on the windshield. This adhesive as described above is preferably of the activateable type. Therefore, the kit also includes a container of activating fluid for the adhesive. Finally, a useful element of the kit is a pressing bar having a rigid or semi-rigid edge such as a squeegee to smoothly press the film in place. Also, a bar similar to those used for wallpaper application could be used.

The kit as described is used to apply the film to a windshield already in place, with a molding around its edge. But the kits can also be made in a series to allow application of the film on a windshield prior to its installation on the vehicle. In this case the impact barrier material is cut to be co-extensive to the edge of the windshield. On installation, the impact barrier will extend under the molding.

In effect all the variations of shape, size, material, clear, opaque, darkened or black barriers can be adapted to the kit.

The kit assembly is particularly helpful to enable consumers to conveniently use the invention, and is also useful for professional windshield installers who are able to work fast and accurately without need for special skills such as cutting the barrier to shape, nor to have an inventory of raw materials.

The foregoing discussion refers to use of pre-formed film material such as the preferred polycarbonate film to provide the impact resistant barrier. It is also an aspect of the invention that the impact resistant barrier can be formed on the windshield by application of a material in a fluid condition, laid down for example by spraying or rolling to create a film or coating which forms after being applied such as by UV, heat, or other curing process. Coloring material can be mixed into the fluid to provide the protection for urethane from degradation. It is considered that all the variations of the invention implemented by a preformed film could be implemented in this manner.

In other aspects of the invention, as stated above, the impact resistant barrier is applied to the windshield in fluid form. The fluid form of the barrier can be applied by any selected method of application such as by spraying, rolling, brushing or dipping. In particular, when applied by spraying, it can be applied by precise spraying in a single or multiple passes to achieve a clean and precise overlay on the glass to the desired thickness, and to a selected width with a smooth even inner boundary. Precise spraying can result in an inner boundary or edge, which is sufficiently even to be aesthetically acceptable to customers. Spraying can also be done using screen printing or other template techniques to define the inner boundary edge of the barrier so as to be sufficiently smooth and clean and to allow sufficient thickness.

In one aspect the barrier is sprayed on the glass outer surface while it is flat. Then the glass is formed to take the final shape to fit the vehicle. In such case the barrier is made of a material mixture that will withstand the heat used to soften the glass for bending. Such a material has to provide an impact absorbing quality after the final formation of the windshield shape. In one embodiment frit material may be used. A frit material is currently used on the inner surface of windshields to block ultra-violet light.

When the barrier is applied as a fluid, it can be applied on the front surface of the windshield (sometimes referred to as the outerlite) to the specified width and thickness dimensions for protection against impacts. This is shown in FIG. 3 which shows a cross-section segment of windshield 6, which has an outer surface 8, an edge surface 10, an inner surface 12, and a laminate film 14. Applied on the outer surface 8 is an impact resistant barrier 16 extending the distance B, which is preferably in the range from about 1 to about 3 inches.

Figure 4:
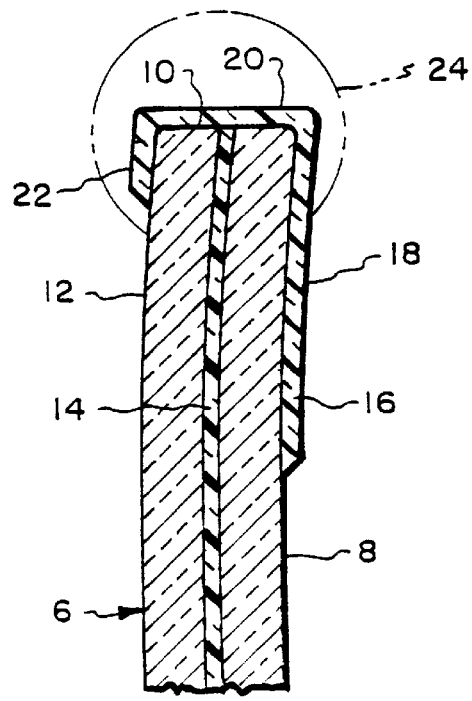
FIG. 4 shows a partial sectional view of a windshield segment with the impact barrier film applied on the front surface and also extending over the edge surface and on the back surface.

The impact resistant barrier may also extend around and cover the edge surface of the windshield, and it may also continue around to the back surface (sometimes referred to as the innerlite) of the windshield. Preferably, the covering on the innerlite will be of lesser width than that on the outerlite. This is shown in FIG. 4 in which a windshield 6, has an outer surface 8, an edge surface 10, an inner surface 12, and a laminate film 14. The impact resistant barrier 16 has a front portion 18, an edge surface 20, and an inner portion 20. The film may be formed by a material being applied as a pre-formed film or as a fluid which forms a solid film. This method and assembly not only provides the impact barrier portion 16 on the outerlite, but also, because it covers the glass edge surface 10 and a portion of the innerlite 12, it will protect the vulnerable edge area (designated as 24) of the glass during transportation and handling. It is known that a large loss is incurred due to damage to the exposed edge area of windshields during transportation and handling, particularly for after market windshields which have to be shipped. This method and resultant assembly therefore serves multiple and diverse functions. It functions as the impact barrier and also to provide the shipping and handling protection.

In another aspect it can be seen that when the barrier is made of material of black or a selected ultra-violet blocking color over at least the outerlite, it not only provides the impact absorbing barrier, but also eliminates need for the black frit which is commonly applied to the innerlite to block ultra-violet sunlight rays from causing deterioration of the urethane material used to mount the windshield to the vehicle. This can be accomplished with any selected means and method of establishing the film.

Figure 5A:
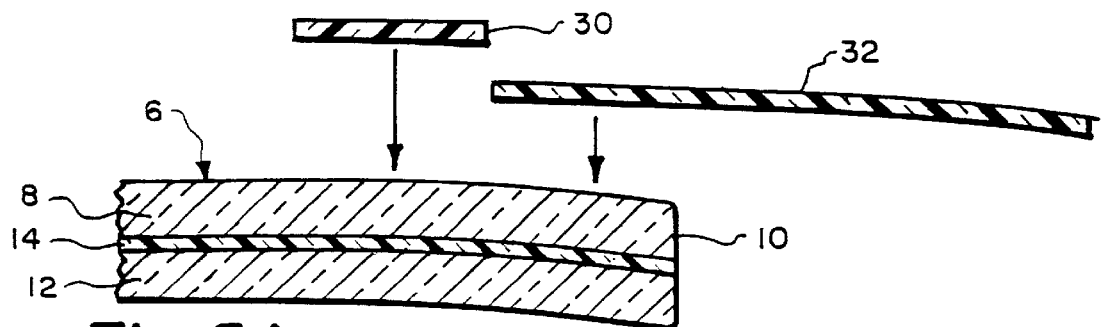
FIG. 5A shows a partial sectional view of a windshield segment and an impact barrier film and a molding portion to be applied.
Figure 5B:
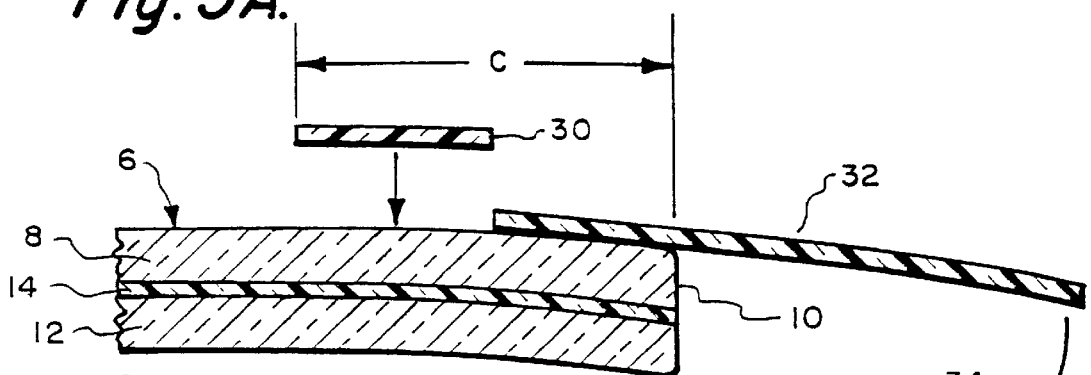
FIG. 5B shows the elements of FIG. 5A in which the molding portion has been applied to the front surface.
Figure 5C:
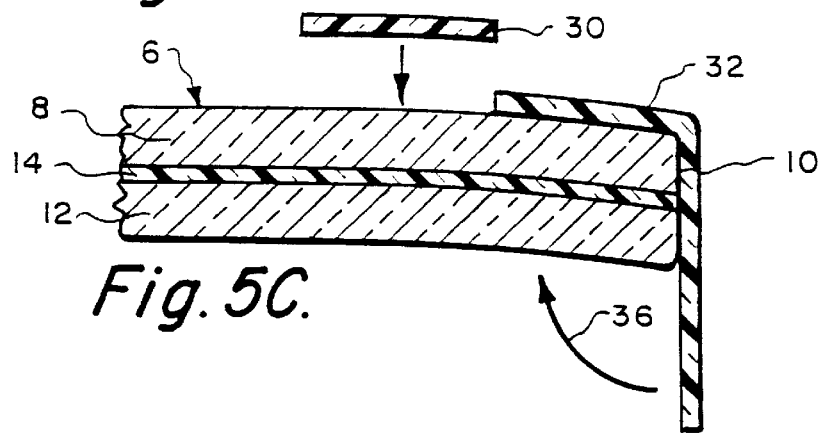
FIG. 5C shows the elements of FIG. 5B in which the molding portion has been progressively folded on the edge surface.
Figure 5D:
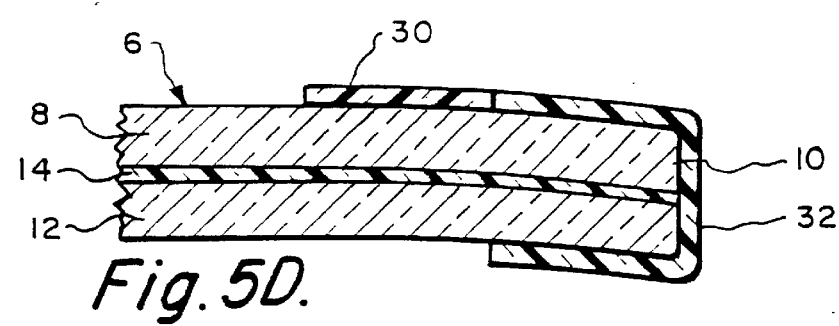
FIG. 5D shows the elements of FIG. 5C in which the molding portion has been progressively folded onto the back surface and the impact barrier film has been applied onto the front surface.
Figure 6A:
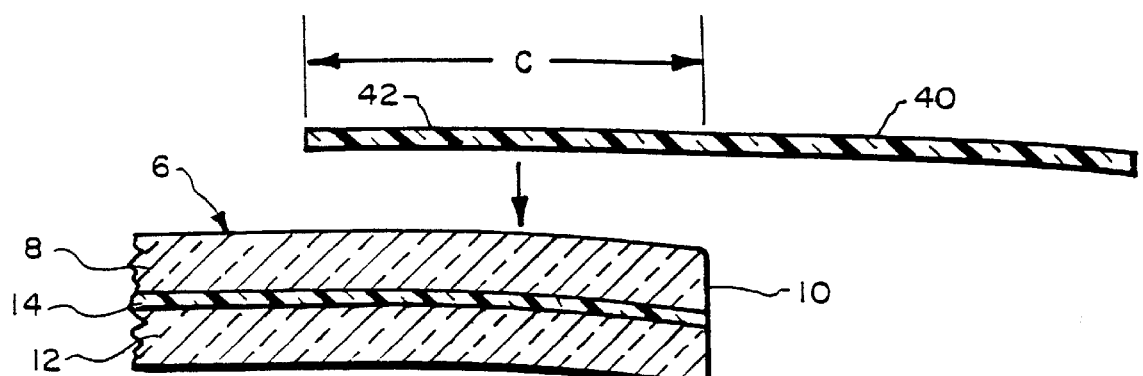
FIG. 6A shows a partial sectional view of a windshield segment and a combined impact barrier and molding film to be applied.
Figure 6B:
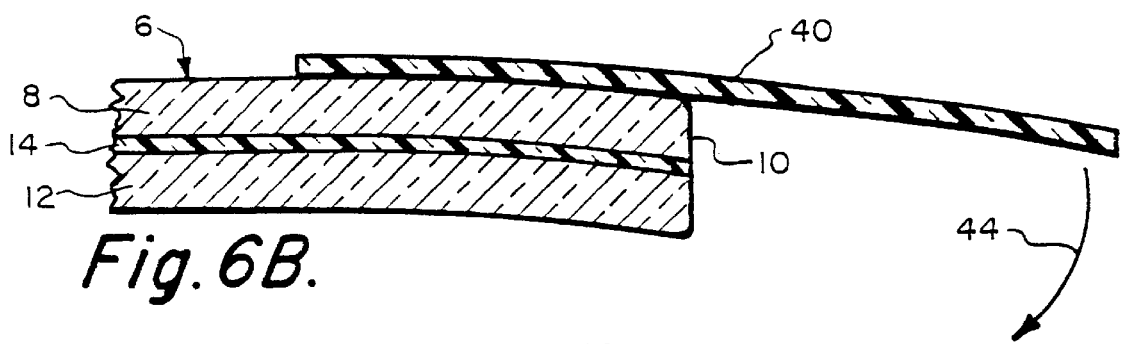
FIG. 6B shows the elements of FIG. 6A in which the combined impact barrier and molding portion has been applied to the front surface.
Figure 6C:
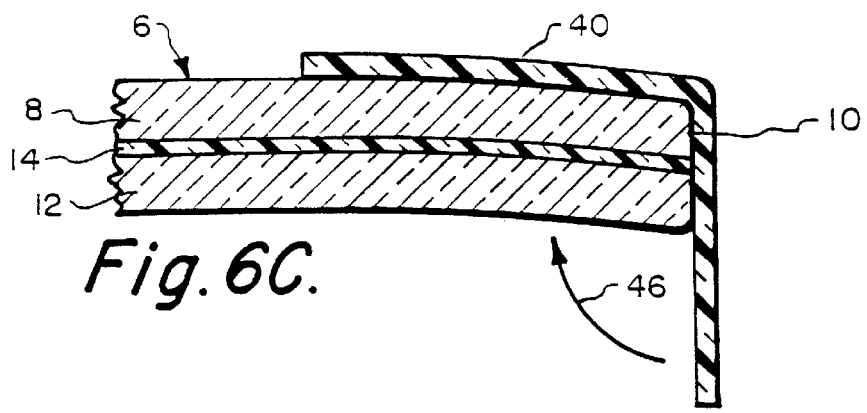
FIG. 6C shows the elements of FIG. 6B in which the combined impact barrier and molding portion has been progressively folded onto the edge surface.
Figure 6D:
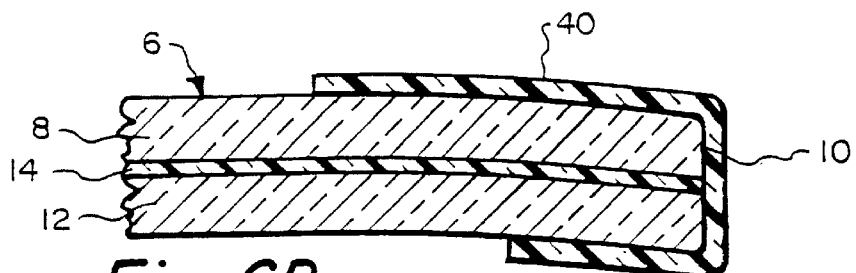
FIG. 6D shows the elements of FIG. 6C in which the combined impact barrier and molding portion has been progressively folded onto the back surface.

Further, a configuration can be employed to eliminate the need for a separate molding strip. That is, the impact barrier can be applied as a preformed film or it can be sprayed or otherwise applied in fluid form along with portions that serve as a substitute for the conventional extruded molding. Still further, by extending the barrier over the edge surface of the windshield it prevents delamination. FIGS. 5A–5D show a windshield segment 6, having an outer surface 8, an inner surface 12, and edge surface 10 and a laminate layer 14. FIG. 5A shows a strip of impact barrier material 30, and a pliable strip of material 32 which will be installed as shown in FIGS. 5B–5D. Although the pliable strip of material 32 is shown as a flat strip of even thickness, it could have a more complex shape so as to create an end resultant shape of a molding suited to the aesthetic and functional requirements of prior molding shapes. The pliable strip 32 is set in place on the outer surface 8 to a selected position. An adhesive is used to secure it. As shown by arrows 34 and 36, the pliable strip 32 is bent into place over the edge surface 10 and over the inner surface 12, thereby forming a molding. The impact barrier strip 30 is set in place on the windshield outer surface 8, held in place with an adhesive, and in adjacent contact with the strip 32 as shown. The pliable strip 32 is preferably made of the same impact resistant material as the impact barrier strip 30, so that together they will provide an integral impact barrier extending the dimension C over the outer surface defining a width of dimension as discussed herein to cover a sufficient portion of the windshield to eliminate edge cracks. The foregoing defines the materials and procedure preferably for an after-market service and assembly such as for installing a new windshield, in which the pliable strip 32 functions as a molding and the barrier strip 30 is put in place adjacent the pliable strip 32 to form an assembly combining a molding and impact barrier. It can also be employed at the OEM level. The plurality of functions served by this method and combinations are stated above.

FIGS. 6A–6D show an alternative embodiment of the method and assembly as described above in which a single pliable strip 40 is used made of impact resistant material. It is shown as a flat strip, but it could be configured to have varying thickness or shaping to provide a desirable molding form. The pliable strip 40 has a portion 42 which will be positioned to cover the outer surface 8 to define a width dimension C, to cover a sufficient amount of the windshield to provide the impact barrier to eliminate edge cracks. The pliable strip 40 is installed in the steps shown in FIGS. 5A–5D first placing it properly on the outer surface 8, with an adhesive and then bending it into place progressively as shown by arrows 44 and 46 to fit over the edge surface 10 and the inner surface 12. The end result is similar to the two piece approach, but done with only one piece.

In the case of the form of FIGS. 5A–5D, the strip 30 and if desired, the strip 32 can be of such color to absorb ultra-violet sunlight rays and in the case of FIGS. 6A–6D, the portion 42, or the entire strip 40 can be so colored.

Figure 7A:
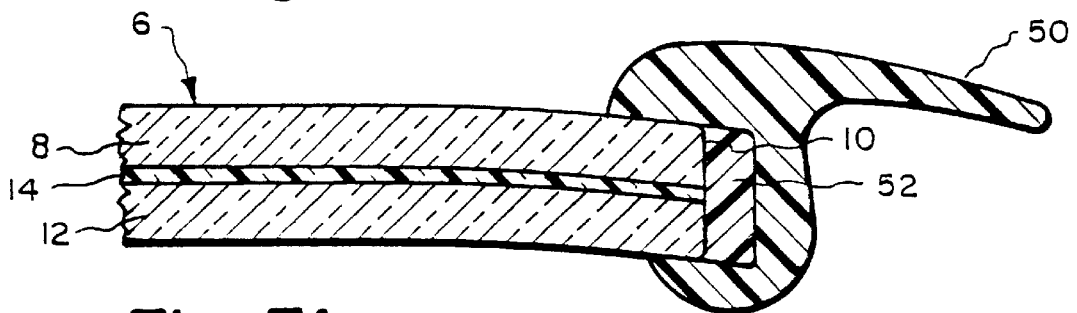
FIG. 7A shows a partial sectional view of a windshield segment with a prior art molding.

FIG. 7A shows a windshield 30 on which has been applied the well known prior art extruded molding strip 50, and held in place by an adhesive and water barrier 52.

Figure 7B:
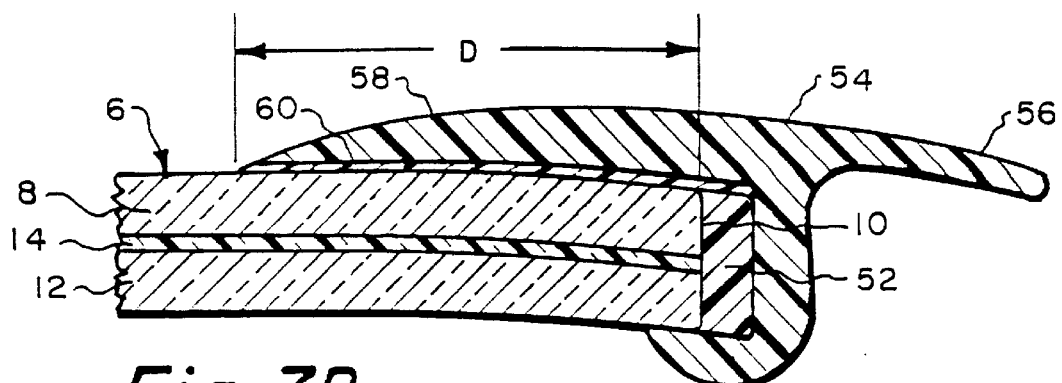
FIG. 7B shows a partial sectional view of a windshield segment with a combined molding and impact barrier assembly.

FIG. 7B shows a form of the present invention having a combination strip 54 which has a portion 56 which is the same as or equivalent to the prior art molding and as an integral part thereof an impact barrier portion 58 which embodies the impact barrier having a selected width D. It too preferably uses an adhesive and water barrier 52, and preferably the impact barrier portion 58 is held down by an adhesive 60.

A barrier width preferably in the range of about 1 to 3 inches, more preferably from about 2 to about 3 inches and most preferably about 3 inches, is sufficient to guard the area in which 80% or more of all impacts which result in cracks occur.

The following table shows the results of parking lot surveys done in various cities during 1998:

| Locations | # of Vehicles | Stone Breaks | Floater Cracks | Edge Cracks | Misc | Repairs |
|---|---|---|---|---|---|---|
| PARKING LOT SURVEYS | | | | | | |
| Memphis, TN | 350 | 169 | 9 | 36 | 4 | 18 |
| Warren, MI | 400 | 190 | 8 | 42 | 9 | 2 |
| Las Vegas, NV | 150 | 61 | 1 | 13 | 3 | N/A |
| Salt Lake, UT | 150 | 69 | 6 | 23 | 4 | N/A |
| Fairmont, MN | 60 | 22 | 1 | 14 | 1 | N/A |
| Bloomington, IL | 200 | 83 | 2 | 20 | 11 | 11 |
| No. Platte, NE | 500 | 247 | 25 | 114 | 9 | 13 |
| Grand Junction, CO | 250 | 106 | 6 | 30 | 3 | 4 |
| Total | 2060 | 947 | 58 | 292 | 44 | |

Background

These surveys were done in large parking lots of locally patronized businesses in order to attempt to limit the vehicle population to local residents as far as possible. When a stone hits the windshield within up to about 3 inches of the edge the windshield cracks almost immediately and the crack always extends to the edge of the windshield. This is called an edge crack. The damage at the impact point may be very small often not even a bullseye or star break but usually a pin head chip. But the resulting crack is catastrophic. When a stone hits beyond the about 3 inch measurement from the edge it creates a stone break (such as a bullseye, star break, etc.). These stones breaks are often about the size of a dime or a nickel, and less than 10% will eventually crack. When they do, they create what is called a floater crack. A floater crack is a long crack not extending to the edge so that it has two end points in the windshield, caused by a stone break that has spread. Thus cracks, or more technically correctly, long cracks consist of edge cracks and floater cracks. Cracked windshields will fail at least four ANSI/SAE Z26 safety tests. The surveys are concentrated or exclusive to passenger vehicles, which in particular have curved portions of windshields. The data is not conclusive and likely not applicable for width selection for vehicles such as buses in particular where the windshield is flat.

Survey Conclusions 1. 83% of windshield long cracks are edge cracks. This is calculated by taking the ratio of edge cracks (292) to the total long cracks (58 floater cracks+292 edge cracks=350 total long cracks) Edge cracks outnumber floater cracks 5 to 1. The stone breaks observed were all more than about 3 inches from the edge.

This is because all impacts about 3 inches or less from the edge become an edge crack almost immediately. An impact within about 3 inches is not termed a stone break because it results in an immediate edge crack. A floater crack starts as a stone break, but at some point it becomes a long crack.

This is frequently due to thermal stress caused by defroster use. This survey confirms the previous surveys above, that guarding preferably at least about 1 to about 3 inches move preferably about 2 to about 3 inches and most preferably about 3 inches from the edge will eliminate over 80% of long cracks. It is noted that these survey observations use the edge of the molding for measurement because the true edge of the glass is not visible. But since it is considered that moldings typically cover about 1 centimeter of the glass front surface, the difference between a measurement from the actual glass edge and from the molding edge is within the range of tolerance of the stated width dimensions defined herein for the impact barrier.

2. Less than 10% of stone breaks actually crack, which is probably why consumers don't bother having them repaired. Less then 4% were repaired.

From other experience and observation it is further concluded that: 1) over 90% of long cracks repaired at windshield repair shops are edge cracks; 2) approximately 80% of windshield replacements are from edge cracks, and 3) a large percentage (63% in recent observations) of impacts (which have resulted in edge cracks) within about 3 inches of the edge result in tiny chips the size of a pin had, with not even a bullseye or star break present; this demonstrates the extreme sensitivity of that area to impacts which result in edge cracks.

The present invention of an impact barrier placed on the periphery of the windshield outerlite can eliminate the edge crack. The optimum width dimension for the impact is now seen to be in range from about 1 to about 3 inches, preferably about 2 to about 3 inches and most preferably about 3 inches. These widths are applicable to the sides and top of the windshield. The bottom of the windshield requires special consideration due to the complex construction of some vehicles. An exposed portion would still be optimum at about 1 to about 3 inches, preferably about 2 to about 3 inches, and most preferably about 3 inches. However, in those constructions where the windshield extends below the hood, a width of up to about 4 inches will provide for an exposed impact barrier in the range desired. Where the bottom of the windshield of simple construction, all of it being above the hood, then the same width range as for the top and sides applies.

Materials which will be successful as the impact barrier include those which can be applied and will have the ability to withstand the impact and prevent the projectile or its impact force from reaching the glass so as to cause a crack. Different such materials will have different thickness. For example polymeric materials such as polycarbonates, polyesters and polyurethane are successful at 6–8 mils. A polyflouride has worked at about 2 mils. Frit or similar ceramic, or glaze type or enamel material will also work.

The data described above, and therefore the conclusions are for consumer vehicles including passenger cars, pick-up trucks and vans. These are the windshields which have been studied. These relate to bowed windshields which are found on such vehicles. Flat windshields such as found in some commercial vehicles may need only about one inch to two inches of impact barrier coverage because they do not have the vulnerable area which results from being bent.

The protection described which extends around the edge area and gives protection from damage in shipment and from delamination is effective for all windshields.

The impact barrier could also be applied to tempered glass such as the backglass and quarterpanels. These are made of tempered glass, but the backglass may only be a single layer and quarterpanels are single layers. These are more susceptible to shattering when hit near the edge. Therefore, use of the present invention on the tempered glass outside surface prevents such breakage.

The windshield has an important interaction with the passenger side air bag, since upon deploying it pushes against the windshield. Consequently, the windshield must stay in place in order that the passenger side air bag functions properly. It has been found that replacement windshields which have not been properly installed can pop out when the air bag deploys against it. The present invention prevents the damage which eases the need for replacements.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A method of guarding a vehicle windshield, having a front surface and a peripheral edge, against impact damage and providing a molding around selected portions of said edge comprising the step of:

preparing in strip form a molding mountable on said selected portions with said molding having an exterior lip that covers said windshield front surface to a width of about 1 inch to about 3 inches.

2. The method of claim 1 further comprising the step of mounting said molding on said selected portions.

3. The method of claim 1 wherein said width is about 3 inches.

4. A method of guarding a vehicle windshield, having a front surface, a back surface and a peripheral edge surface therebetween, against damage during handling and transportation and against impact damage after said windshield has been installed, comprising the step of:

adhering an impact resistant material around selected portions of the periphery of said front surface of said windshield with said material being adhered around said edge surface and onto said back surface of said windshield, said material extending on said front surface a selected first width of at least about 1 inch and on said back surface a selected second width.

5. The method of claim 4 wherein said step of adhering includes the substeps of:

applying said material in fluid form, and causing said material to become a solid impact resistant film defining an impact barrier strip on said front surface, said edge surface and said back surface.

6. The method of claim 4 wherein said first width is from about 1 inch to about 3 inches.

7. The method of claim 4 wherein said selected portions include at least one of:

a. the sides of said windshield,
b. the top of said windshield,
c. the bottom of the windshield, and
said first width is greater than said second width.

8. The method of claim 4 wherein said material is a selected ultraviolet blocking color whereby said material blocks sunlight that degenerates urethane used to mount said windshield.

9. The method of claim 4 wherein said material includes a preformed first strip of film material that is applied by adhering said first strip to said front surface, said edge surface and said back surface.

10. The method of claim 9 wherein said first strip extends a width on said front surface in the range from about 1 inch and about 3 inches.

11. The method of claim 9 wherein said material includes a preformed second strip that is applied and adhered adjacent to said first strip on said front surface.

12. The method of claim 11 wherein said first width, including the width of said first strip on said front surface and the width of said second strip, is form about 1 inch to about 3 inches.

* * * * *